United States Patent [19]

Whitman et al.

[11] Patent Number: 4,480,286

[45] Date of Patent: Oct. 30, 1984

[54] CAPACITOR CASE INSULATION AND METHOD OF INSTALLATION

[75] Inventors: Boyce D. Whitman; Donald G. Beltz, both of Pickens; Morris T. Reese, Taylors, all of S.C.

[73] Assignee: Sangamo Weston, Inc., Norcross, Ga.

[21] Appl. No.: 342,580

[22] Filed: Jan. 25, 1982

[51] Int. Cl.³ .......................... H01G 4/22; H01G 4/38
[52] U.S. Cl. ..................................... 361/314; 361/328
[58] Field of Search .................... 361/328, 329, 314

[56] References Cited

U.S. PATENT DOCUMENTS 3,014,167  12/1961  Winter ................................. 361/329

FOREIGN PATENT DOCUMENTS 2848180  5/1979  Fed. Rep. of Germany ...... 361/328

Primary Examiner—Donald A. Griffin
Attorney, Agent, or Firm—Dale Gaudier

[57] ABSTRACT

A power factor capacitor made with case to housing insulation of thin electrical grade polypropylene in multilayers to greatly exceed basic impulse level voltage test requirements.

5 Claims, 1 Drawing Figure

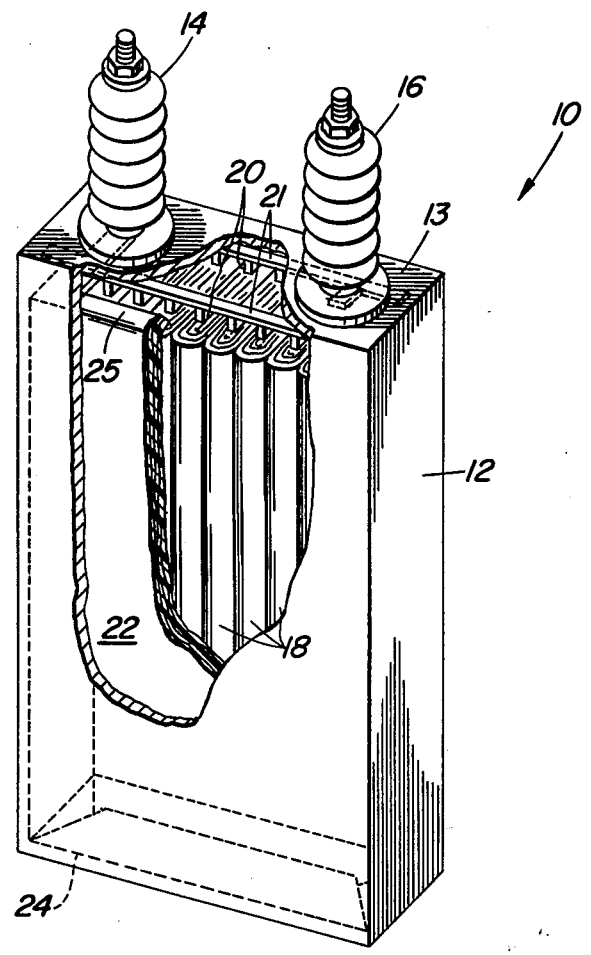

CAPACITOR CASE INSULATION AND METHOD OF INSTALLATION

FIELD OF THE INVENTION

The present invention relates to dielectric capacitors and more particularly to that class of capacitors applied on the distribution and feeder lines of electric utility systems for power factor correction purposes.

BACKGROUND OF THE INVENTION

Power factor correction capacitors, known as power capacitors, are made up of individual capacitor windings. Each winding consists of at least two electrode foils separated by at least one dielectric spacer film. The windings are placed together and encircled by wraps of dielectric insulating film.

The windings of a power capacitor must be insulated from the metal case of the capacitor, both for the safety of the personnel who may come in contact with the case, and for preventing breakdown of the capacitor when high overpotentials, such as lightning on the feeders or switching impulses, are imposed on the capacitor.

Once in the case, the individual capacitor windings are connected internally in series/parallel combinations so that the required voltage and KVAR rating can be obtained. Finally, the dielectric spacer films are impregnated with a dielectric fluid as disclosed in the U.S. Pat. No. 4,117,579 granted to Shaw et al.

In the past, the dielectric spacer and insulating films were entirely of dielectric impregnated paper. Due to the anticipated advantages of more uniform product quality, smaller dielectric constant, and higher voltage stress characteristics, it has long been believed that it would be desirable to replace all the paper in a power capacitor with synthetic resin film.

With recent advances in dielectric impregnation technology, it has been found to be possible to manufacture workable capacitors having all synthetic resin spacer films as shown in U.S. Pat. No. 3,363,156 granted to Cox.

However, despite the change to synthetic resin spacer films in the windings, those skilled in the art were unable to successfully replace the paper dielectric insulating films with synthetic resin films between the windings and the case. While some of the paper dielectric insulating films could be changed to a synthetic resin, some paper was still required within the capacitor; attempts to replace all of the paper with all synthetic resin films have been unavailing.

For example, when taking advantage of the high voltage stress characteristics of a synthetic resin of the polyolefin family, polypropylene, and replacing paper with comparable thickness polypropylene in thinner total thickness because of polypropylene's higher voltage stress capability, the all polypropylene capacitors would fail under the Basic Impulse Level (BIL) test which simulates high impulse overpotentials.

Other experiments have led those skilled in the art to believe that an all synthetic resin film capacitor was not possible. For example, when nine layers of ten mils thickness poylpropylene directly replaces the conventional thirteen layers of seven mils thickness paper for a 95 KVBIL capacitor, current draw or failure occurs at withstand voltages which are 10% low. Even when additional layers of polypropylene are added to increase the total thickness by 60%, a proportional increase in BIL withstand voltage capability could not be achieved.

Thus, there has been a long halt to progress in developing an all synthetic resin film power capacitor in which there is no paper present.

SUMMARY OF THE INVENTION

The present invention provides an improved capacitor having a decreased capacitance from winding to case and an improved and more consistent BIL withstand voltage. The windings are all encircled by a thin synthetic resin dielectric insulating film in multiple layers.

It has also been found that the present invention facilitates formation of the end portions around the capacitor windings resulting in less damage to the windings and insulation during assembly.

The above and additional advantages of the present invention will become apparent to those skilled in the art from a reading of the following detailed description when taken in conjunction with the accompanying drawings.

BRIEF DESCRIPTION OF THE DRAWINGS

The drawing is an isometric view, partially in section, of a capacitor incorporating the present invention.

DESCRIPTION OF THE PREFERRED EMBODIMENT

Referring now to the drawing, there is shown a power factor correction capacitor 10. The capacitor 10 includes a hollow metal housing or case 12 having two terminals 14 and 16 extending from the top cover 13 thereof.

Inside the capacitor case 12, there are a plurality of capacitor windings 18. The capacitor windings 18 are manufactured by winding various electrode foils, generally two or more, interleaved with dielectric spacer films into rolls. Spaced along and in contact with the electrode foils are tabs, generally designated by the numeal 20, which extend from one end of the rolls. The rolls are flattened to form the capacitor windings 18.

The flattened capacitor windings 18 are then held in an abutted position in a mandrel fixture. The beginning of a synthetic resin film sheet 22 is either taped or overlapped on the windings and the mandrel driven to wind the film 22 in multiple layers around the capacitor windings 18. This dielectric insulating film 22 will be discussed in greater detail later.

After the capacitor windings 18 are covered by multiple layers of the dielectric film 22, the bottom ends of the dielectric film are folded over as shown by 24. The entire capacitor element is then inserted in the case 12 and the tabs 20 are connected internally in various series/parallel combinations as shown by 21 to obtain the required voltage and KVAR rating. Then the top ends of the dielectric film are folded as shown at 25 but in a fashion similar to 24 to insulate the top of the windings, tabs, resistors, and leads from the case 12.

After the requisite connections are made, the tabs 20 are operatively connected to the terminals 14 and 16, and the cover 13 is then sealed on the case 12. Once the cover 13 is sealed to the case 12, the contents of the case 12 are impregnated with an insulating dielectric liquid, as is well-known in the art and covered by a number of U.S. Patents, such as: Lapp, U.S. Pat. No. 3,746,953; Eustance, U.S. Pat. No. 3,833,978; Shaw, U.S. Pat. No. 4,190,682; Shaw, U.S. Pat. No. 4,117,579; and DiNicola et al., U.S. Pat. No. 4,228,481. The impregnation is accomplished through a hole (not shown) in the cover 13.

Conventional capacitors have different rated voltages and different BIL (Basic Impulse Level) ratings. With regard to the BIL rating, the rating test is substantially that of NEMA (National Electrical Manufacturers Association) standard CP1-5.06 Impulse Withstand Test-Case Insulation. The test consists of three successive 1.2×50 microsecond positive full-wave impulses of predetermined tolerances applied between the connected-together-terminals and the case of the capacitor. The highest KV value of the impulse crest without current flow between the windings and the case establishes the KVBIL (kilovolts basic impulse level) rating. Typical ratings are 30, 75, 95, 125, 150, and 200 KVBIL. The test simulates lightning strikes on the feeder lines and switching impulses.

For a capacitor rated at 95 KVBIL, conventional paper capacitors use seven mil paper with thirteen layers, or separate sheets, for 91 mils total thickness of capacitor case insulation. In attempting to make a direct substitution of synthetic resin film for paper, nine layers of 10 mils of the polyolefin resin polypropylene were utilized for a total thickness of 90 mils of case insulation. During testing, the polypropylene capacitos broke down under a BIL withstand voltage which was 10% less than the 95 KVBIL required. Increasing the total thickness up to 144 mils (60% increase in thickness) did not provide a corresponding rise in BIL voltage withstand to the the 95 KV level.

In taking a fresh, new approach, an attempt was made to use thinner polypropylene in multiple wraps. Since a 0.7 mil polypropylene, which is sometimes used in the windings, was available, this was wrapped around the windings in multiple wraps until a thickness of polypropylene was otained which is comparable to the total thickness of paper. Empirically, it has been determined for a 95 KVBIL capacitor, 130 layers of 0.7 mil polypropylene for a 91 mil total thickness will allow the capacitor to be rated at 95 KVBIL with a substantial safety factor.

Experimentation has shown that commercially available non-dielectric grade poylpropylene which is stressable to only about 200 volts/mil is inadequate for practising the present invention. Thus, it has been found that electrical grade polypropylene, generally rated to withstannd at least 600 volts per mil or greater electrical stressing, is required.

Further experimentation has determined that for 125, 150, and 200 KVBIL capacitors, 200, 250, and 300 layers, respectively, of 0.7 mil polypropylene will be more than sufficient. Generally, the 125 KVBIL are ratings for 15 to 24 kilovolt rating capacitors while the 150 and 200 KVBIL ratings are for capacitors over 20 kilovolts.

Additional testing has shown that the safety factor in these tests may be as high as 35% above requirement because 95 KVBIL capacitors with only eighty-six layers of 0.7 mil polypropylene have survived testing. Further, it is believed that the ability to withstand BIL withstand voltage may be a function of having a multiplicity of layers rather than merely being a function of the thicknesses of the polypropylene and the total thickness of the insulation.

The operating mechanism of the present invention is still not clearly understood. However, it is speculated that inclusions in the synthetic resin of contaminants caught in the films during assembly may effectively short circuit the effectiveness of just a few thick layers of film thus leading to failure under the BIL tests. Possibly, paper is not as subject to failure due to inclusions and is less puncturable around contaminants, since comparable paper capacitors do not fail the BIL tests.

By increasing the number of layers, it is possible that each inclusion and each contaminant has less effect on overall performance allowing the present polypropylene capacitor dielectric insulation film to pass the BIL test. This indicates that even thinner polypropylene in even more layers for a smaller total thickness would produce a capacitor which could pass the appropriate BIL tests. Thicker polypropylene in fewer layers would be less satisfactory, for example, under sixteen layers, and thicker than ten mils; or many layers of thicker polypropylene would be wasteful.

While the easiest way of manufacturing a capacitor in accordance with the present invention is by winding one film around the windings on a rotational mandrel fixture, large numbers of separate sheets merely rolled around the windings could also be used to provide the multiple layers.

The folding in of the ends, as shown by 24, further eases installation and prevents damage to the capacitor element.

As many possible embodiments may be made of the invention without departing from the scope thereof, it is to be understood that all matters set forth herein or shown in the accompanying drawing are to be interpreted in an illustrative and not limiting sense.

What is claimed is:

1. An electrical capacitor comprising:
    a housing;
    at least one capacitor winding disposed in said housing, said capacitor winding including at least one pair of electrode films separated by a dielectric spacer film;
    a synthetic resin insulating film disposed in at least sixteen layers about said at least one capacitor winding as the only insulation between said capacitor and said housing, said insulating film having a thickness of not greater than 10 mils and a dielectric strength of greater than 600 volts per mil; and
    a dielectric liquid disposed in said housing wetting said dielectric spacer and insulating films.

2. The capacitor as claimed in claim 1 wherein said insulating film is substantially the same thickness or thicker than said dielectric spacer films.

3. The capacitor as claimed in claim 2 wherein said insulating film is an electrical grade polyolefin material.

4. The capacitor as claimed in claim 3 wherein said polyolefin material is polypropylene.

5. The capacitor as claimed in claim 1 wherein said insulating film surrounds said capacitor winding and is larger than said spacer films.

* * * * *